George W. N. Yost.
Harvester
Nº 85,887. Patented Jan. 12. 1869.
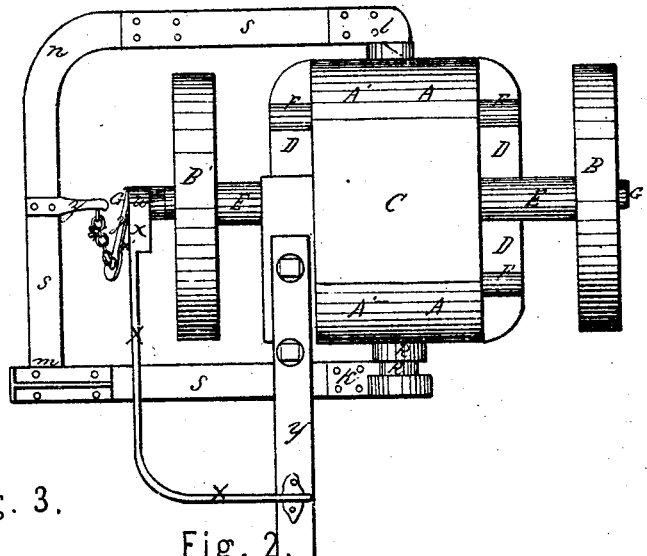
Fig. 1.
Fig. 3.
Fig. 2.
Fig.
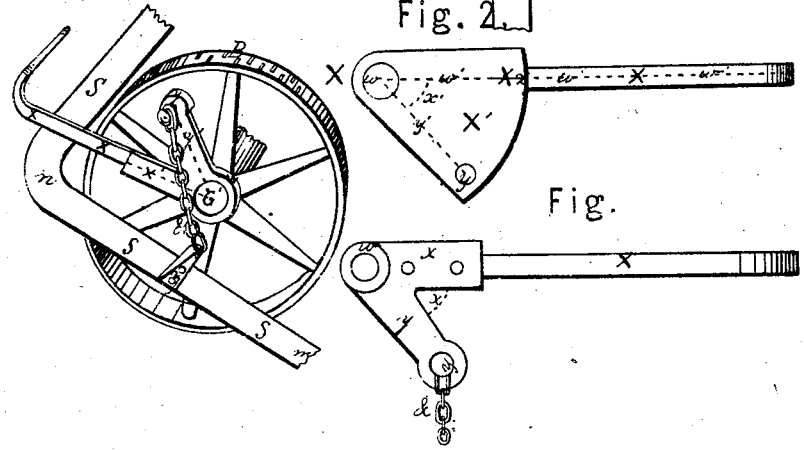
Witnesses
James Densmore,
William Hansleton
Inventor.
G. W. N. Yost,
by Atty Jo C Clayton

UNITED STATES PATENT OFFICE.

GEORGE W. N. YOST, OF CORRY, PENNSYLVANIA, ASSIGNOR TO THE CORRY MACHINE COMPANY.

IMPROVEMENT IN HARVESTERS.

Specification forming part of Letters Patent No. 85,887, dated January 12, 1869.

*To all whom it may concern:*

Be it known that I, GEORGE W. N. YOST, of Corry, Erie county, Pennsylvania, have invented a Climax-Lever Arrangement, an improvement on my climax floating-bar for grass and grain cutting machines.

The following description, illustrated by the accompanying drawings, will enable others to make the invention, description and drawings having corresponding specifying characters.

Figure 1 of the drawings is a combined view of my climax-body and my climax floating-bar with my climax floating-lever attached. Figs. 2 and 17 are side views of the lever detached. Fig. 3 is a side or end view of the body, floating-bar, lever, and main axle combined.

A and A' are two cases, forming my climax-body. C, D, E, and F are attachments of the cases. G and G' are the main axles, and S is my climax floating-bar attached to the body.

Surround the traveling-wheel B' with the bar S, and attach the bar S, at the ends $k$ and $l$, to the middle of the fore end and to the middle of the hind end of the body A and A'. Extend the axle G' four to six inches, more or less, out from the traveling wheel B'. Over the outer end of the axle G' put a sleeve, $w$, large enough to work loosely on the axle. To the sleeve $w$ attach a lever-bar, X, three feet long, more or less, and bend and extend it around the traveling wheel B', and rest the loose end on the tongue Y. Also attach to the sleeve $w$ an arm, $y$, six inches long, more or less, and reaching below the lever-bar X, as in Fig. 17.

A convenient way is to make the sleeve $w$ and the arm $y$ and an arm, $x$, similar to the arm $y$, all of one piece of cast-iron, and make the lever-bar X of wrought-iron, and to bolt the lever-bar X to the arm $x$.

The lever-bar X and the sleeve $w$ and the arms $x$ and $y$ combined make one instrument only—the lever X—and may be made all in one piece; and when the words "lever X," in contradistinction to the words "lever-bar X," are written in this specification the whole combined instrument is meant—namely, a lever to reach from the main axle round the traveling wheel to the tongue, with a hole in the hind end to go over the outer end of the axle, and with an arm to reach down and incline a little forward from the hind end.

The lever X may be made of a lever-bar, X, three feet long, more or less, with a sort of flange or plate, five inches (more or less) wide at the fore end, from the point $x$ to the point $y$, tapering to a point at the hind end, with a hole, $w$, in the hind end, and all made of one solid piece, as seen in Fig. 2.

Make the angle $x'$ between the arms $x$ and $y$, or between the lever-bar X and the arm $y$, as seen in Fig. 17, or between the longitudinal line $w'$ and the line $y'$, from the point $y$ to the point $w$ of the lever X, as seen in Fig. 2, acute—that is, less than ninety degrees. Forty degrees to fifty degrees, or forty-five degrees, is the better size.

Attach the end of the arm $y$, as seen in Figs. 1 and 17, or the corner $y$, as seen in Fig. 2, of the lever X, by a chain or other connection, and to the bar S, or to a fixture, $z$, of the bar S, reaching to the vertical plane of and directly below the outer end of the axle G'. Thus made, the handle of the lever X, or its loose end, when in its ordinary position and the cutting-machinery is not to be raised, will extend over, above, and beyond that part of the floating-bar S from $m$ to $k$, and rest on the tongue Y, convenient for the driver, sitting over the body A and A', to seize and operate.

Being pivoted on the main axle G', midway between the front part of the floating-bar S, reaching from $m$ to $k$, and the back part, reaching from $n$ to $l$, when the handle of the lever is thrown over and behind the traveling wheel B', the lever-bar X will fall and rest on the back part of the floating-bar, reaching from $n$ to $l$; and when the handle of the lever is thrown over behind the traveling wheel, and the lever-bar is laid on the back part of the floating-bar, the end of the arm $y$ or the point or corner $y$ will be lifted from below and forward of the main axle-fulcrum G', and be thrown over and behind the fulcrum, and will raise the outer side part of the floating-bar from $m$ to $n$, and whatever cutting-machinery is thereto attached; and the end of the arm $y$, or the point or corner $y$, being forward of the fulcrum when the handle of the lever rests on the tongue, and behind the fulcrum when the lever-bar rests on the floating-bar back of the traveling wheel, the lever necessarily will be "locked," or held in place, either on the tongue or on the back part of the floating-bar, at the discretion of the operator, by the force of its own weight combined with whatever weight is attached to the end of the arm or point or corner $y$ pressing it down, and the unyielding tongue or floating-bar holding it from going any farther down without any separate special button, hook, catch, or other fastening.

The nature of the invention is in so combining a lever, fulcrumed on the main axle as close as may be to the weight to be raised, with the floating-bar, that the lever readily may be made to lift that part of the floating-bar to which the cutting machinery is attached; and the floating-bar, by its own and whatever weight is attached to it, at one part pulling the lever down, and by its own immovability at another part holding the lever up, will "lock" and hold the lever in place without any separate or other fastening.

There is nothing new in the lever X, nor in raising the floating-bar and cutting machinery by a lever; but my particular combination, arrangement, and application I think new, and know to be useful, and I limit myself thereto. Therefore,

I claim—

The arrangement of the lever K, pivoted to the main axle $G'$, with the floating-bar S, so that the arm $y$ or the point $y$ of the lever attachment of the floating-bar, in lifting the floating-bar, will be thrown over and beyond a vertical line through the center of the main axle, substantially as described for grass and grain cutting machines.

G. W. N. YOST.

Witnesses:
C. W. ARCHBOLD,
FRANK H. W. GREGG.